US012573867B2

(12) United States Patent
Tsuge et al.

(10) Patent No.: US 12,573,867 B2
(45) Date of Patent: Mar. 10, 2026

(54) RECOVERY PROCESSING METHOD OF LITHIUM ION BATTERY, CHARGE/DISCHARGE DEVICE, AND STORAGE MEDIUM

(71) Applicant: HONDA MOTOR CO., LTD., Tokyo (JP)

(72) Inventors: Hodaka Tsuge, Wako (JP); Shunsuke Konishi, Wako (JP); Seiichi Koketsu, Wako (JP); Hidetoshi Utsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 562 days.

(21) Appl. No.: 17/971,673

(22) Filed: Oct. 24, 2022

(65) Prior Publication Data

US 2023/0208172 A1    Jun. 29, 2023

(30) Foreign Application Priority Data

Dec. 28, 2021    (JP) ................................. 2021-214861

(51) Int. Cl.
*H02J 7/00*          (2006.01)
(52) U.S. Cl.
CPC .......... *H02J 7/0069* (2020.01); *H02J 7/0048* (2020.01); *H02J 7/007184* (2020.01)
(58) Field of Classification Search
CPC .. H02J 7/007184; H02J 7/0069; H02J 7/0048; H02J 7/00; Y02W 30/84;

(Continued)

(56) References Cited

U.S. PATENT DOCUMENTS 5,432,426 A * 7/1995 Yoshida ............ H02J 7/007184
                                                          320/160
9,429,626 B2 * 8/2016 Shiraishi ............ G01R 31/3835
                                (Continued)

FOREIGN PATENT DOCUMENTS

CN          106443471          2/2017
CN          109901076 A  *  6/2019
                                (Continued)

OTHER PUBLICATIONS

Japanese Notice of Allowance for Japanese Patent Application No. 2021-214861 mailed Dec. 24, 2024.
(Continued)

*Primary Examiner* — Jared Fureman
(74) *Attorney, Agent, or Firm* — Amin, Turocy & Watson, LLP

(57)          ABSTRACT

A recovery processing method of a lithium ion battery having a positive electrode and a negative electrode and in which performance has decreased due to a residue of lithium ions in the negative electrode, the method comprises: repeating a cycle a plurality of times, the cycle including: a first process of setting an SOC of the lithium ion battery to a first value, that is equal to or smaller than a value of the SOC in which a gradient of an SOC-voltage curve is a minimum value and that is equal to or greater than the value of the SOC in which the gradient of the SOC-voltage curve is two times the minimum value, by charging; and a second process of setting the SOC of the lithium ion battery to a second value, that is smaller than the first value, by discharging.

6 Claims, 6 Drawing Sheets

(58) Field of Classification Search
CPC ... Y02E 60/10; H01M 10/4242; H01M 10/44; H01M 10/0525; H01M 10/54; H01M 10/42; H01M 10/48; H01M 10/4207
USPC .......................................................... 320/130
See application file for complete search history.

(56) References Cited

U.S. PATENT DOCUMENTS

| | | | | |
|---|---|---|---|---|
| 10,491,011 | B2 * | 11/2019 | Uchida | G01R 31/392 |
| 10,790,552 | B2 * | 9/2020 | Isomura | H01M 10/4242 |
| 10,923,774 | B2 * | 2/2021 | Kusano | H01M 10/4285 |
| 11,251,627 | B2 * | 2/2022 | Fukaya | B60L 58/16 |
| 11,710,863 | B2 * | 7/2023 | Hirowatari | H01M 4/382 |
| | | | | 320/134 |
| 11,721,840 | B2 * | 8/2023 | Yoshioka | H01M 10/48 |
| | | | | 429/188 |
| 11,817,739 | B1 * | 11/2023 | Lazarov | H02J 7/007194 |
| 12,126,203 | B2 * | 10/2024 | Miyaki | H02J 7/007 |
| 2011/0012604 | A1 * | 1/2011 | Tsujiko | H01M 4/5825 |
| | | | | 324/427 |
| 2014/0149058 | A1 | 5/2014 | Moh | |
| 2014/0232410 | A1 | 8/2014 | Hayashi et al. | |
| 2016/0146898 | A1 | 5/2016 | Lennevi et al. | |
| 2016/0193939 | A1 | 7/2016 | Smidebrant et al. | |
| 2018/0067168 | A1 * | 3/2018 | Mitsuhashi | G01R 31/388 |
| 2018/0261889 | A1 * | 9/2018 | Kusano | H01M 10/44 |
| 2024/0347787 | A1 * | 10/2024 | Mehta | H01M 10/052 |

FOREIGN PATENT DOCUMENTS

| | | | | |
|---|---|---|---|---|
| JP | 2000-277164 | 10/2000 | | |
| JP | 2009-252381 | 10/2009 | | |
| JP | 2014-127283 | 7/2014 | | |
| JP | 2016-530863 | 9/2016 | | |
| JP | 2016-531278 | 10/2016 | | |
| JP | 2017091923 A * | 5/2017 | | |
| JP | 2018-156744 | 10/2018 | | |
| JP | 2018156744 A * | 10/2018 | | |
| JP | 6627675 B2 * | 1/2020 | | |
| JP | 2021-082531 | 5/2021 | | |
| JP | 2021-103646 | 7/2021 | | |
| JP | 2022-142030 | 9/2022 | | |
| WO | WO-2021224990 A1 * | 11/2021 | | H01M 10/48 |

OTHER PUBLICATIONS

Japanese Office Action for Japanese Patent Application No. 2021-214861 mailed Sep. 10, 2024.
Japanese Office Action for Japanese Patent Application No. 2021-214859 mailed Aug. 20, 2024.
Non-Final Office Action for U.S. Appl. No. 17/971,678 mailed Jul. 30, 2025.
Chinese Office Action for Chinese Patent Application No. 202211290658.1 mailed Dec. 18, 2025.

* cited by examiner

RECOVERY PROCESSING METHOD OF LITHIUM ION BATTERY, CHARGE/DISCHARGE DEVICE, AND STORAGE MEDIUM

CROSS-REFERENCE TO RELATED APPLICATION

Priority is claimed on Japanese Patent Application No. 2021-214861, filed Dec. 28, 2021, the content of which is incorporated herein by reference.

BACKGROUND OF THE INVENTION

Field of the Invention

The present invention relates to a recovery processing method of a lithium ion battery, a charge/discharge device and a storage medium.

Description of Related Art

In recent years, for the purpose of $CO_2$ reduction from the viewpoint of climate-related disasters, the interest in electric automobiles has increased, and use of lithium ion batteries for in-vehicle use is being considered.

Lithium ion batteries may experience a drop in performance due to repeated charge/discharge cycles. As a method of recovering the performance of a lithium ion battery, a method of placing the lithium ion battery under predetermined conditions has been proposed (for example, see Japanese Unexamined Patent Application, First Publication No. 2000-277164 and Japanese Unexamined Patent Application, First Publication No. 2014-127283).

SUMMARY OF THE INVENTION

The above-mentioned technologies have not been sufficiently effective in recovering the performance of lithium ion batteries.

One of objects of the present invention is directed to providing a recovery processing method of a lithium ion battery, a charge/discharge device and a storage medium, which are excellent with regard to an effect of recovering the performance of lithium ion batteries.

A recovery processing method of a lithium ion battery, a charge/discharge device and a storage medium according to the present invention employ the following configurations.

(1) A recovery processing method of a lithium ion battery according to an aspect of the present invention is a recovery processing method of a lithium ion battery having a positive electrode and a negative electrode and in which performance has decreased due to a residue of lithium ions in the negative electrode, the method including: repeating a cycle a plurality of times, the cycle including: a first process of setting an SOC of the lithium ion battery to a first value, that is equal to or smaller than a value of the SOC in which a gradient of an SOC-voltage curve is a minimum value and that is equal to or greater than the value of the SOC in which the gradient of the SOC-voltage curve is two times the minimum value, by charging; and a second process of setting the SOC of the lithium ion battery to a second value, that is smaller than the first value, by discharging.

(2) In the aspect of the above-mentioned (1), the first value is 30% or less.

(3) In the aspect of the above-mentioned (1) or (2), the second value is less than 10%.

(4) In the aspect of any one of the above-mentioned (1) to (3), prior to the first process and the second process, whether or not there is a decrease in performance of the lithium ion battery is determined, and the first process and the second process are performed only when a decrease in performance is confirmed.

(5) A charge/discharge device according to an aspect of the present invention is a charge/discharge device electrically connected to a lithium ion battery having a positive electrode and a negative electrode and in which performance is decreased by a residue of lithium ions in the negative electrode, the charge/discharge device including a controller configured to perform charge/discharge of the lithium ion battery, the controller repeats a cycle a plurality of times, and the cycle including: a first process of setting an SOC of the lithium ion battery to a first value, that is equal to or smaller than a value of the SOC in which a gradient of the SOC-voltage curve is a minimum value and that is equal to or greater than the value of the SOC in which the gradient of the SOC-voltage curve is two times the minimum value, by charging; and a second process of setting the SOC of the lithium ion battery to a second value, that is smaller than the first value, by discharging.

(6) A non-transitory computer readable storage medium storing a program according to an aspect of the present invention is configured to cause a charge/discharge device, which is electrically connected to a lithium ion battery having a positive electrode and a negative electrode and in which performance is decreased by a residue of lithium ions in the negative electrode, to repeat a cycle a plurality of times, and the cycle includes: a first process of setting an SOC of the lithium ion battery to a first value, that is equal to or smaller than a value of the SOC in which a gradient of the SOC-voltage curve is a minimum value and that is equal to or greater than the value of the SOC in which the gradient of the SOC-voltage curve is two times the minimum value, by charging; and a second process of setting the SOC of the lithium ion battery to a second value, that is smaller than the first value, by discharging.

According to the aspects of the above-mentioned (1) to (6), it is possible to provide a recovery processing method of a lithium ion battery, a charge/discharge device and a storage medium, which are highly effective in recovering performance of a lithium ion battery.

DETAILED DESCRIPTION OF THE INVENTION

Hereinafter, embodiments of a recovery processing method of a lithium ion battery, a charge/discharge device and a storage medium of the present invention will be described with reference to the accompanying drawings.

[Lithium Ion Battery]

Figure 1:
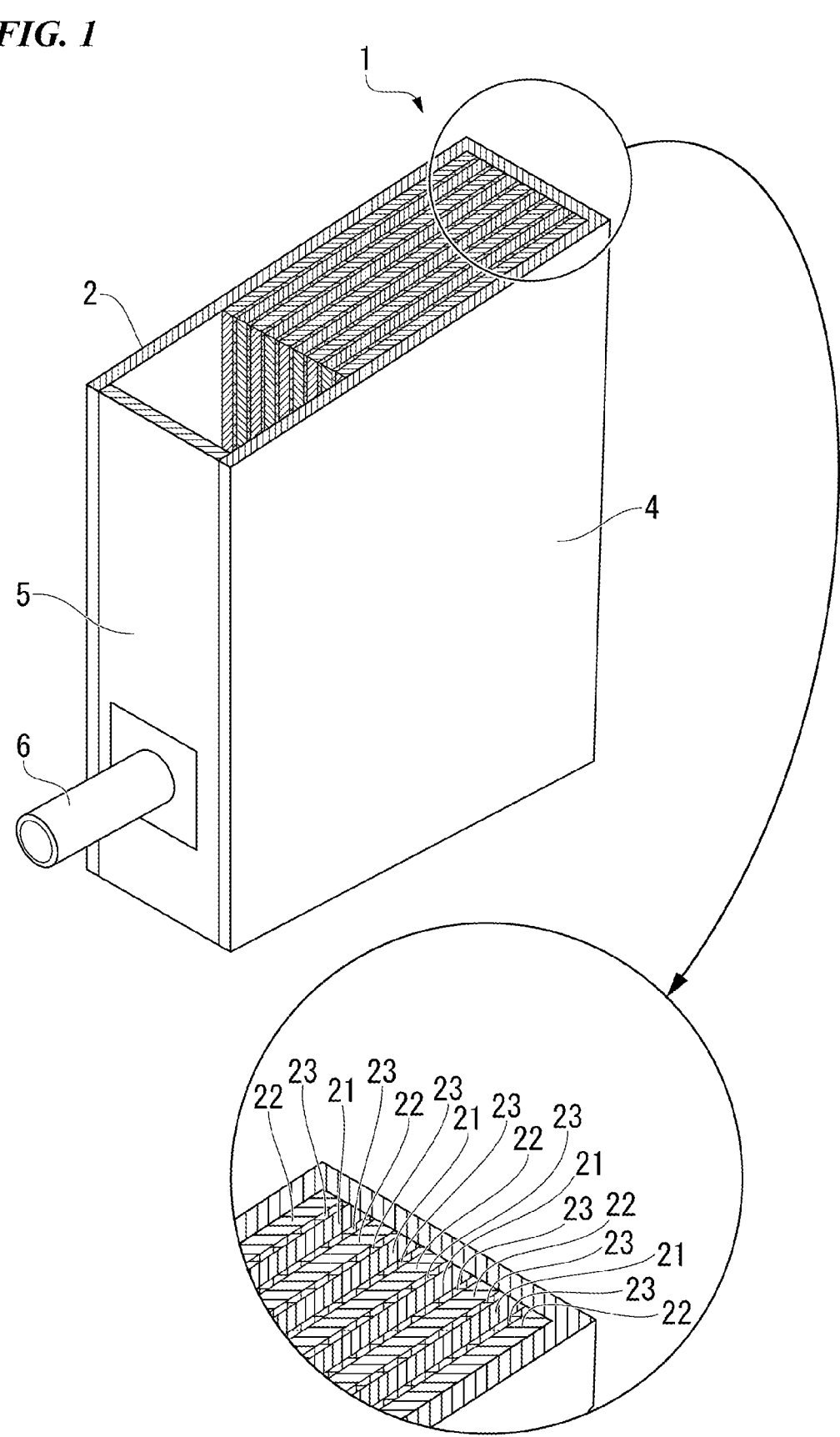
FIG. 1 is a perspective view of an example of a lithium ion battery.

FIG. 1 is a perspective view of an example of a lithium ion battery.

As shown in FIG. 1, a lithium ion battery 1 includes a laminated body 2 including an electrode, an exterior body 4 configured to accommodate the laminated body 2, and a lid body 5 configured to seal the exterior body 4. The exterior body 4 is, for example, a housing formed of a metal. A positive electrode terminal 6 and a negative electrode terminal 7 (see FIG. 2) are provided in the exterior body 4 or the lid body 5.

The laminated body 2 includes a positive electrode 21, a negative electrode 22, and a separator 23. The separator 23 is interposed between the positive electrode 21 and the negative electrode 22. The positive electrode 21, the negative electrode 22 and the separator 23 are impregnated with an electrolytic solution.

The positive electrode 21 has a positive electrode collector and a positive electrode active material layer. The positive electrode active material is, for example, a lithium complex oxide containing nickel, cobalt, and the like. The lithium complex oxide is, for example, a lithium nickel complex oxide, a lithium cobalt complex oxide, a lithium manganese complex oxide, a lithium nickel cobalt complex oxide, a lithium nickel manganese complex oxide, a lithium nickel cobalt manganese complex oxide, or the like.

The negative electrode 22 has a negative electrode collector and a negative electrode active material layer. The negative electrode active material is a carbon material such as graphite or the like.

The separator 23 is formed of a resin such as polyethylene (PE), polypropylene (PP), or the like.

The electrolytic solution contains, for example, a nonaqueous solvent, and a lithium salt (electrolyte). As the nonaqueous solvent, ethylene carbonate (EC), propylene carbonate (PC), and diethyl carbonate (DEC) are exemplified. As the electrolyte, lithium hexafluorophosphate (LiPF6), lithium tetrafluoroborate (LiBF4), or the like, may be exemplified.

The lithium ion battery 1 is mounted on, for example, a vehicle.

[Charge and Discharge Device]

Figure 2:
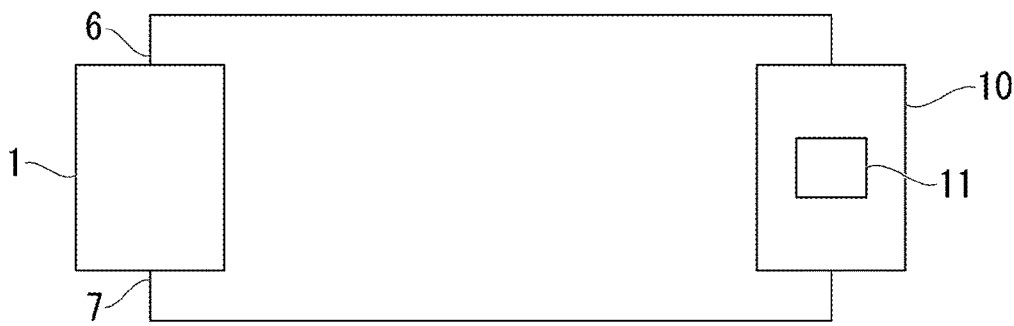
FIG. 2 is a configuration view of a charge/discharge device.

FIG. 2 is a configuration view of a charge/discharge device 10 of the embodiment.

As shown in FIG. 2, the charge/discharge device 10 is electrically connected to the positive electrode terminal 6 and the negative electrode terminal 7 of the lithium ion battery 1. The charge/discharge device 10 includes a controller 11. The controller 11 can perform charge/discharge of the lithium ion battery 1 according to a recovery processing method, which will be described below. The charge/discharge device 10 may include a power supply configured to charge the lithium ion battery 1. When the power supply is not provided, an external power supply is used. The charge/discharge device 10 is mounted on, for example, a vehicle. The charge/discharge device 10 may be mounted on a battery exchanging device.

The controller 11 is realized by executing a program (software) using a hardware processor such as a central processing unit (CPU) or the like. Some or all of the components may be realized by hardware (a circuit part; including circuitry) such as a large scale integration (LSI), an application specific integrated circuit (ASIC), a field-programmable gate array (FPGA), a graphics processing unit (GPU), or the like, or may be realized by cooperation of software and hardware. The program may have been previously stored in a storage device such as an HDD, a flash memory, or the like, of the controller 11 (a storage device including a non-transient storage medium), and may be stored in a detachably storage medium such as a DVD, a CD-ROM, or the like, and installed in the HDD or the flash memory of the controller 11 by mounting the storage medium (non-transient storage medium) in a drive device.

[Decrease in Performance of Lithium Ion Battery Due to Repetition of Charge/Discharge]

The lithium ion battery may experience a decrease in performance such as capacity deviation due to repeated charge/discharge.

According to "Studies on Modeling Deterioration in Lithium Ion Batteries", Kentaro Kaji, and four others, Transactions of the Society of Automotive Engineers of Japan, Society of Automotive Engineers of Japan, Vol. 44 (2013), No. 2, pp. 429-434, three factors are exemplified as a degradation mechanism of the lithium ion battery.

(1) The total amount of active lithium decreasing due to lithium ions remaining inside a negative electrode material and not coming out.

(2) The total amount of active lithium ion decreases due to reduction of lithium ions (i.e., gaining electrons) on the negative electrode surface, and reaction with the electrolytic solution.

(3) A resin film is formed on the negative electrode surface reacted with the electrolytic solution, and an internal resistance of the battery increases as the lithium ions become less likely to pass therethrough.

The above-mentioned (1) is referred to as "a residue of lithium ions in a negative electrode deep part" (lithium ion residue in a negative electrode). The above-mentioned (2) is referred to as "lithium precipitation." The above-mentioned (3) is referred to as "formation of SEI." In the lithium precipitation, precipitation of needle crystals is referred to as dendrite precipitation.

The lithium precipitation is likely to occur at a low temperature (for example, 0° C. or less). On the other hand, the residue of the lithium ions in the negative electrode deep part is likely to occur at a temperature equal to or larger than a normal temperature (for example, a temperature exceeding 0° C., and 10° C. to 65° C. as a specific example).

The residue of the lithium ions in the negative electrode deep part will be described in detail.

Figure 3A:
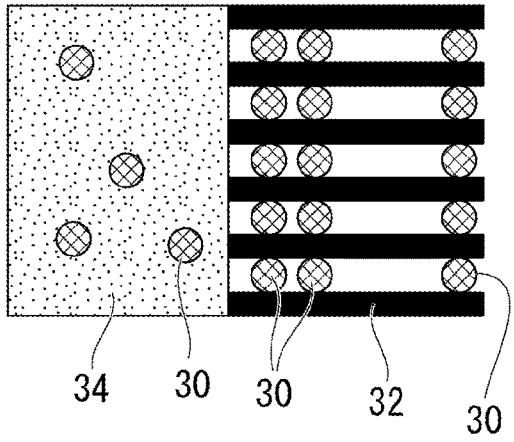
FIG. 3A is a view schematically showing movement of lithium ions in a negative electrode during charging.
Figure 3B:
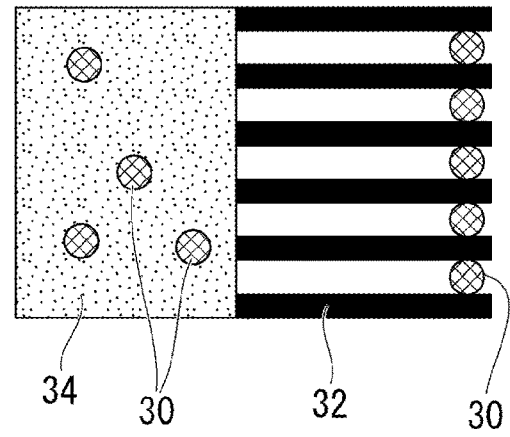
FIG. 3B is a view schematically showing movement of lithium ions in the negative electrode during discharging.

FIG. 3A and FIG. 3B are views schematically showing movement of lithium ions in the negative electrode. FIG. 3A is a view during charging. FIG. 3B is a view during discharging. Reference numeral 34 designates an electrolytic solution.

As shown in FIG. 3A, a negative electrode 32 is filled with lithium ions 30 at the time of charging. As shown in FIG. 3B, the lithium ions 30 in the negative electrode 32 are decreased at the time of discharging. When the charge/discharge is repeated, more of the lithium ions 30 remain in the deep part of the negative electrode 32 even during discharging. This is referred to as a residue of lithium ions in the negative electrode deep part. When the residue of the lithium ions in the negative electrode deep part is increased, a decrease in active lithium ions leads to a decrease in capacity.

Figure 4:
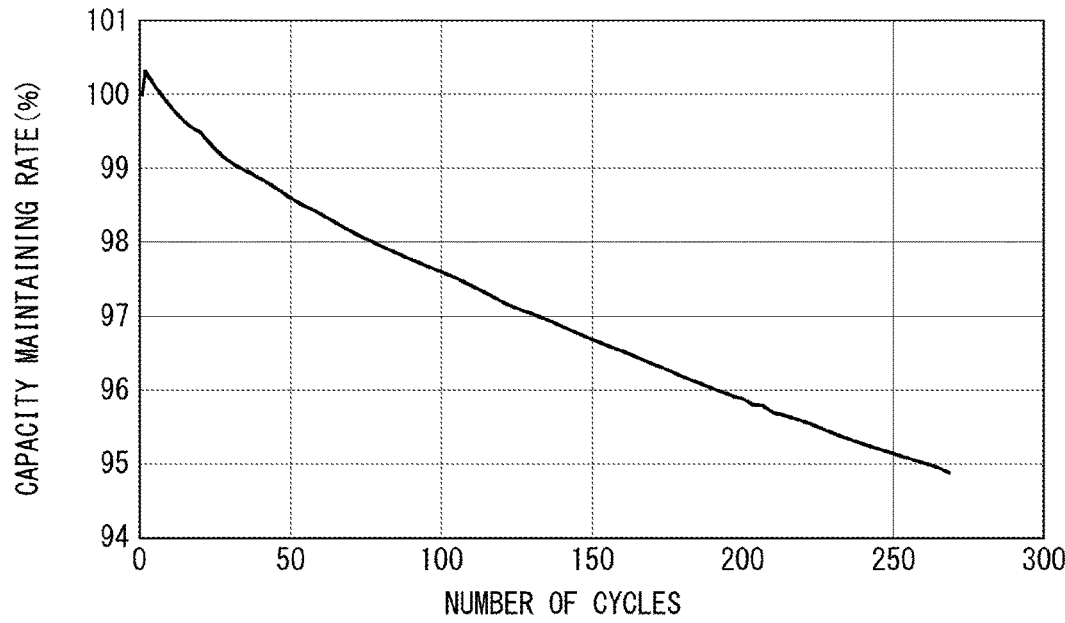
FIG. 4 is a graph showing an example of variation in discharge capacity in a charge/discharge test.

FIG. 4 is a graph showing an example of variation in discharge capacity in a charge/discharge test. FIG. 4 shows the variation in discharge capacity based on a capacity maintenance factor. The capacity maintenance factor is expressed as "current capacity/initial capacity×100(%)."

As shown in FIG. 4, in the lithium ion battery in the example, as a number of cycles (a number of repetitions) of charge/discharge increases a discharge capacity gradually decreases.

[Recovery Processing Method of Lithium Ion Battery]

The lithium ion battery with a decrease in performance can exhibit performance recovery by the following method. A recovery processing method described below can be performed by the charge/discharge device 10 (see FIG. 2).

Figure 5:
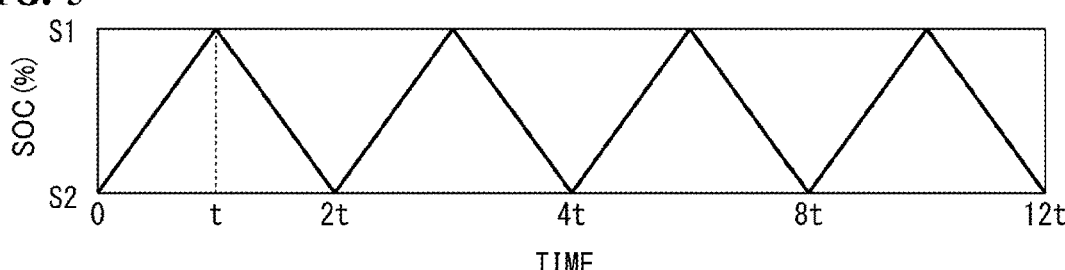
FIG. 5 is a view for describing an example of a recovery processing method of a lithium ion battery of an embodiment.

FIG. 5 is a view for describing an example of the recovery processing method of the embodiment. Further, the recovery processing method of the lithium ion battery is also simply referred to as "a recovery processing method."

As shown in FIG. 5, the recovery processing method of the embodiment repeats a cycle including the following two processes a plurality of times.

A first process: An SOC of the lithium ion battery is set to an upper limit value S1 by charging. The upper limit value S1 is an example of "a first value."

A second process: An SOC of the lithium ion battery is set to a lower limit value S2 by discharging. The lower limit value S2 is an example of "a second value."

Prior to the first process, a preparation process of discharging the lithium ion battery to a discharge termination voltage may be performed.

The state of charge (SOC) is a charge rate (%) of the lithium ion battery. In the recovery processing method of the embodiment, since a first process of setting the SOC to the upper limit value S1 and a second process of setting the SOC to the lower limit value S2 are repeated, the SOC is increased or decreased repeatedly. In the recovery processing method of the embodiment, in the first process, the SOC is increased linearly. In the second process, the SOC is decreased linearly.

In the example shown in FIG. 5, while an initial process is the first process, either the first process or the second process may come first.

Figure 6:
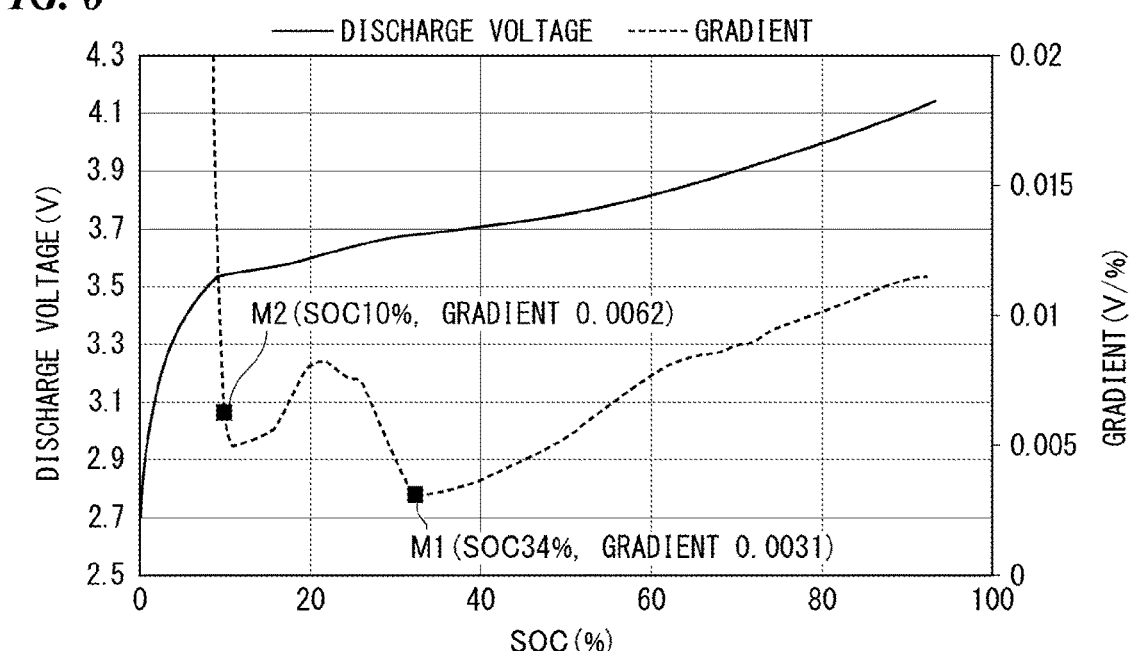
FIG. 6 is an example of an SOC-voltage curve.

FIG. 6 is an example of "an SOC-voltage curve" expressing a relation between the SOC and the voltage. A lateral axis of FIG. 6 shows the SOC (%). A vertical axis of FIG. 6 shows a voltage (V). The SOC-voltage curve can be acquired as follows.

A capacity of the lithium ion battery is obtained, for example, as follows.

A lithium ion battery using lithium complex oxide of a ternary system containing cobalt, nickel and manganese as a positive electrode active material will be exemplified. A rated voltage is a 3.6 V. A capacity is 3 Ah. An upper limit voltage is 4.2 V. A lower limit voltage is 2.5 V.

After the lithium ion battery is placed in a thermostatic oven at 25° C. and is left for four hours, the following operations are performed under a temperature condition of 25° C. in the thermostatic oven.

(1) The lithium ion battery is discharged to 2.5 V at a current of 3 A (corresponding to 1 C at a rated capacity), and left for 10 seconds.

(2) The lithium ion battery is charged to 4.2 V at a constant current of 3 A.

(3) The lithium ion battery is charged at a constant voltage of 4.2 V until the current becomes 0.6 A (corresponding to 0.2 C at the rated capacity).

(4) The lithium ion battery is discharged to 2.5 V at a constant current of 3 A. The capacity upon the discharge is measured.

During the discharge (operation (4)), the voltage is measured at each second.

The SOC is calculated by "(capacity−current·time)/capacity×100(%)."

The SOC-voltage curve shown in FIG. 6 can be created by the obtained SOC and voltage.

A gradient of the SOC-voltage curve is a linear gradient obtained by linearly approximating a range of the SOC from 30 seconds before to 30 seconds after the present time point by using a least square method, regarding the SOC and the voltage. The gradient of the SOC-voltage curve is a proportion (V/%) of a variation amount of a voltage (V) with respect to a variation amount (%) of the SOC.

The upper limit value S1 (see FIG. 5) of the SOC is set to a value of the SOC or less at a point M1 where the gradient of the SOC-voltage curve is a minimum value in FIG. 6. In the example shown in FIG. 6, the gradient of the SOC-voltage curve is a minimum value of 0.0031 at a point M1. The SOC at this time is 34%. For this reason, the upper limit value S1 of the SOC is set to 34% or less. The upper limit value S1 is preferably 50% or less (for example, 30% or less).

Since the upper limit value S1 of the SOC is set to the value of the SOC or less at the point M1, a residual amount of the lithium ion in the negative electrode can be reduced, and a decrease in performance such as capacity deviation or the like can be suppressed.

The upper limit value S1 (see FIG. 5) of the SOC is preferably a value of the SOC or more at a point M2 where the gradient of the SOC-voltage curve is two times the minimum value in FIG. 6. The SOC at the point M2 is smaller than the SOC at the point M1. In the example shown in FIG. 6, the gradient of the SOC-voltage curve is a value (0.0062) two times the minimum value of 0.0031 at the point M2. The SOC at this time is 10%. For this reason, the upper limit value S1 of the SOC is preferably 10% or more.

When the upper limit value S1 of the SOC is the value of the SOC or more at the point M2, the residual amount of the lithium ions in the negative electrode can be reduced, and a decrease in performance such as capacity deviation or the like can be suppressed.

The lower limit value S2 (see FIG. 5) of the SOC is 0% or more and is smaller than the upper limit value S1. The lower limit value S2 may be 0%. The lower limit value S2 is, for example, less than 10%.

In FIG. 6, the lower limit value S2 may be equal to the value of the SOC at the point M2, in which the gradient of SOC-voltage curve is two times the minimum value, or more, and may be equal to the value of the SOC at the point M1, in which the gradient of the SOC-voltage curve is the minimum value, or less.

In the recovery processing method of the embodiment, prior to the recovery processing including the first process and the second process, which are described above, only when whether or not there is a decrease in performance of the lithium ion battery is determined and the decrease in performance is confirmed, the recovery processing may be executed. Whether or not there is a decrease in performance can be determined on the basis of, for example, the recovery rate of the capacity. A non-operation period of the lithium ion battery can be shortened by determining whether there is a decrease in performance.

[Effect Exhibited by Recovery Processing Method of Embodiment]

According to the recovery processing method of the embodiment, a cycle including a first process of setting the SOC to the upper limit value S1 by charging and a second process of setting the SOC to the lower limit value S2 by discharging is repeated a plurality of times. The upper limit value S1 is set equal to the value of the SOC at the point M1 or less in which the gradient of the SOC-voltage curve is the minimum value. The upper limit value S1 is set to be equal to or greater than the value of the SOC at the point M3. Accordingly, the residual amount of the lithium ions in the negative electrode can be reduced, and the decrease in performance such as capacity deviation or the like can be suppressed. Accordingly, the performance of the lithium ion battery can be recovered.

Improvement of the energy efficiency can be achieved by lengthening a lifespan of the lithium ion battery due to performance recovery of the lithium ion battery.

Hereinabove, while the aspect performed by the present invention has been described using the embodiment, the present invention is not particularly limited to the embodiment and various modifications and substitutions may be made without departing from the scope of the present invention.

Hereinafter, the present invention will be described in detail on the basis of the specific example. Further, the present invention is not limited to the following example.

Example 1

A lithium ion battery using lithium complex oxide of a ternary system containing cobalt, nickel and manganese as a positive electrode active material was prepared. A rated voltage was 3.6 V. A capacity was 3 Ah. An upper limit voltage was 4.2 V. A lower limit voltage was 2.5 V.

(Fabrication of Sample with Decrease in Performance)

The lithium ion battery was provided for a charge/discharge test described as follows.

After the lithium ion battery was placed in a thermostatic oven at 25° C. and left for four hours, the following operations (A) and (B) were repeated by 269 cycles under a temperature condition of 25° C. in the thermostatic oven.

(A) The lithium ion battery is discharged to 2.5 V at a current of 9 A and left for 10 seconds.

(B) The lithium ion battery is charged to 4.2 V at a current of 9 A and left for 10 seconds.

Accordingly, a sample with a decrease in performance (degradation) was obtained.

(Recovery Processing)

As shown in FIG. 5, a cycle including the first process and the second process was repeated on the above-mentioned sample using the charge/discharge device 10 (see FIG. 2) a plurality of times (120 times). A processing time was 20 hours. The temperature was 25° C. The number of samples was five. The SOC-voltage curve is shown in FIG. 6.

A preparation process: The lithium ion battery was discharged to 2.5V (the lower limit value S2: SOC 0%) (a discharge termination voltage) at a current of 9 A.

A first process: The lithium ion battery was charged to 0.75 Ah (the upper limit value S1: SOC 25%) at a current of 9 A. The charge time was five minutes.

A second process: The lithium ion battery was discharged to 2.5 V (the lower limit value S2: SOC 0%) (a discharge termination voltage) at a current of 9 A. The discharge time was five minutes.

An initial capacity of the lithium ion battery, a capacity after the decrease in performance (after degradation) and a capacity after recovery were measured by the above-mentioned capacity measurement method.

A recovery rate was calculated by the following equation. The results are shown in Table 1.

$$\text{Recovery rate} = (\text{capacity after recovery} - \text{capacity after degradation})/(\text{initial capacity} - \text{capacity after degradation})$$

TABLE 1

| Sample | No. 1 | No. 2 | No. 3 | No. 4 | No. 5 | Average |
|---|---|---|---|---|---|---|
| Initial capacity (Ah) | 2.98 | 3.02 | 3.02 | 3.04 | 2.97 | 3.01 |
| Capacity after degradation (Ah) | 2.82 | 2.88 | 2.87 | 2.90 | 2.84 | 2.86 |
| Capacity after recovery (Ah) | 2.89 | 2.94 | 2.94 | 2.96 | 2.90 | 2.93 |
| Recovery rate (%) | 44 | 43 | 47 | 43 | 46 | 44.46 |

As shown in Table 1, a high recovery rate was obtained by the above-mentioned recovery processing.

Example 2

A recovery processing test was performed in the same manner as Example 1 except for the upper limit value S1 of the SOC. The results are shown in Table 2 and FIG. 7.

For comparison, the results when the upper limit value S1 and the lower limit value S2 are 0% (i.e., when the charge/discharge are not performed) are also shown.

TABLE 2

| Charge capacity (Ah) | 0 | 0.3 | 0.75 | 1.4 | 1.6 |
|---|---|---|---|---|---|
| SOC upper limit value (%) | 0 | 10.6 | 26.6 | 48.8 | 55.2 |
| SOC lower limit value (%) | 0 | 0 | 0 | 0 | 0 |
| Voltage (V) at completion of first cycle charging | 2.682 | 3.603 | 3.715 | 3.812 | 3.848 |
| Initial capacity (Ah) | 2.92 | 2.98 | 2.98 | 3.04 | 3.04 |
| Capacity after degradation (Ah) | 2.88 | 2.82 | 2.82 | 2.87 | 2.90 |
| Capacity after recovery (Ah) | 2.89 | 2.88 | 2.89 | 2.91 | 2.89 |
| Recovery rate (%) | 25 | 38 | 44 | 24 | −7 |

Figure 7:
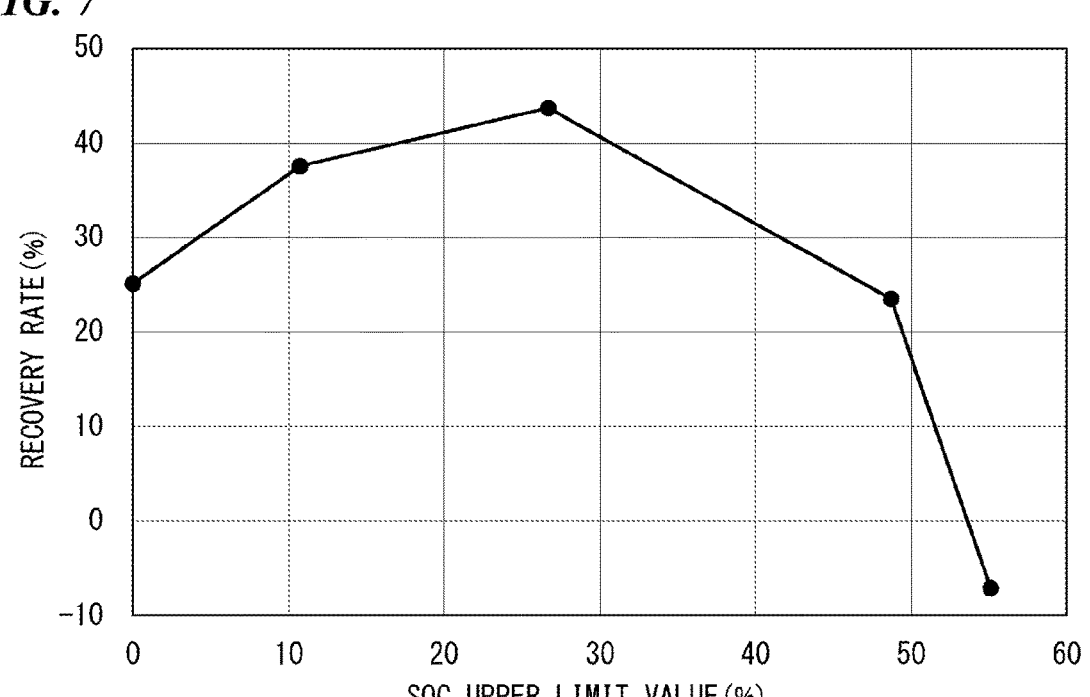
FIG. 7 is a graph showing a test result.

As shown in Table 2 and FIG. 7, when the upper limit value S1 is 10% or more and 30% or less, the recovery rate was increased.

Example 3

A recovery processing test was performed in the same manner as Example 1 except for the upper limit value S1 and the lower limit value S2. The results are shown in Table 3 and FIG. 8.

TABLE 3

| Charge/discharge capacity (Ah) | 0.75 | 0.6 | 0.5 | 0.25 |
|---|---|---|---|---|
| Voltage (V) at completion of first cycle discharging | 2.5 | 3.183 | 3.329 | 3.367 |
| SOC upper limit value (%) | 26.6 | 26.5 | 26.0 | 26.6 |
| SOC lower limit value (%) | 0.0 | 5.3 | 8.7 | 17.7 |
| Initial capacity (Ah) | 2.98 | 2.98 | 3.04 | 2.96 |
| Capacity after degradation (Ah) | 2.82 | 2.83 | 2.89 | 2.82 |
| Capacity after recovery (Ah) | 2.89 | 2.89 | 2.94 | 2.84 |
| Recovery rate (%) | 44 | 40 | 33 | 14 |

Figure 8:
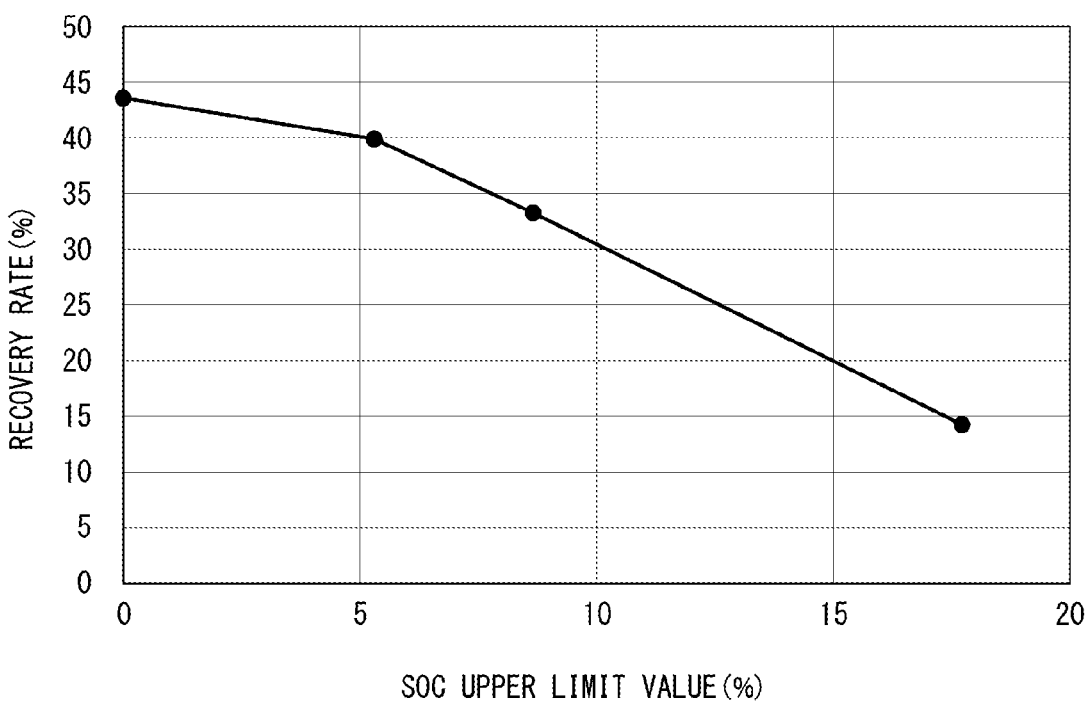
FIG. 8 is a graph showing a test result.

As shown in Table 3 and FIG. 8, the recovery rate was increased when the lower limit value S2 is less than 10%.

Example 4

Figure 9:
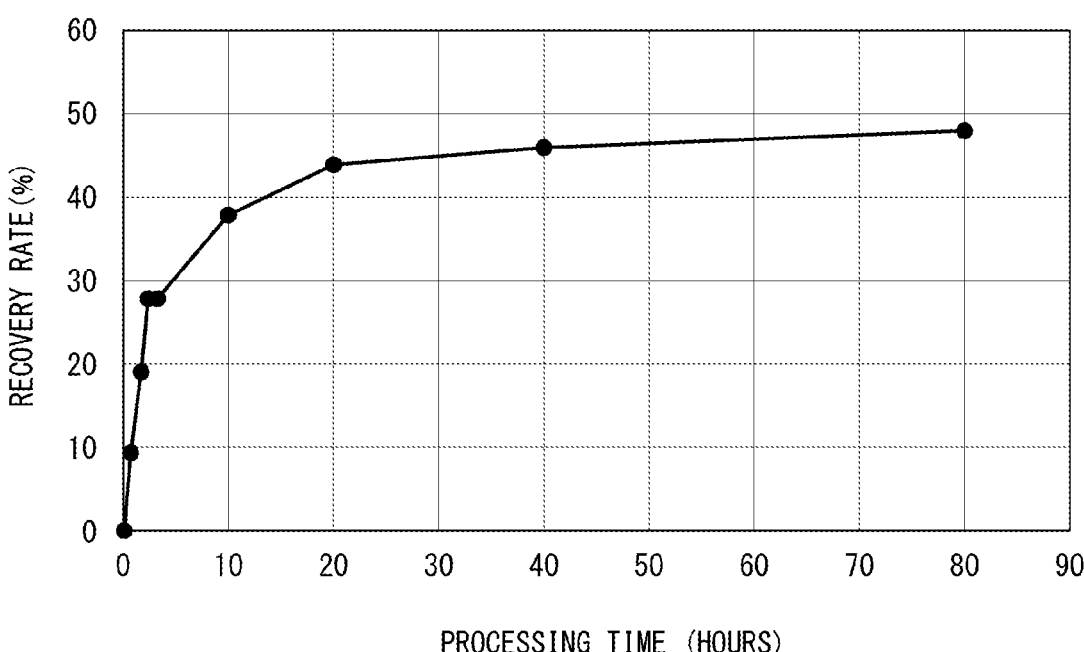
FIG. 9 is a graph showing a test result.

A recovery processing test was performed in the same manner as Example 1 except for the number of repetitions (number of cycles) of the cycle constituted by the first process and the second process. The results are shown in Table 4 and FIG. 9. A lateral axis of FIG. 9 shows a processing time. The processing time is approximately proportional to the number of cycles.

Table 4 and FIG. 9 also show the results when the number of cycles is zero for comparison.

TABLE 4

| | Number of cycles | | | | | | | | |
|---|---|---|---|---|---|---|---|---|---|
| | 0 | 5 | 10 | 15 | 20 | 60 | 120 | 240 | 480 |
| Time (hours) | 0 | 0.8 | 1.7 | 2.5 | 3.3 | 10 | 20 | 40 | 80 |
| Recovery rate | 0 | 9.3 | 19 | 28 | 28 | 38 | 44 | 46 | 48 |

As shown in Table 4 and FIG. 9, a higher recovery rate was obtained with a larger number of cycles.

Example 5

A recovery processing test was performed in the same manner as Example 2 except for the current was 3 A. Since the current is 3 A, the charge time and the discharge time are three times those in Example 2. Since the processing time is 20 hours that is the same as in Example 2, the number of repetitions of the cycle is about ⅓ of the number of repetitions (120 times) of Example 2. The results are shown in Table 5 and FIG. 10.

TABLE 5

| Charge capacity (Ah) | 0 | 0.3 | 0.75 | 1.4 | 1.6 |
|---|---|---|---|---|---|
| Voltage (V) at completion of first cycle charging | 2.532 | 3.532 | 3.643 | 3.736 | 3.771 |
| Initial capacity (Ah) | 3 | 2.96 | 3.02 | 2.96 | 2.95 |
| Capacity after degradation (Ah) | 2.86 | 2.82 | 2.87 | 2.82 | 2.8 |
| Capacity after recovery (Ah) | 2.89 | 2.88 | 2.93 | 2.85 | 2.79 |
| Recovery rate (%) | 21 | 43 | 40 | 21 | −7 |

Figure 10:
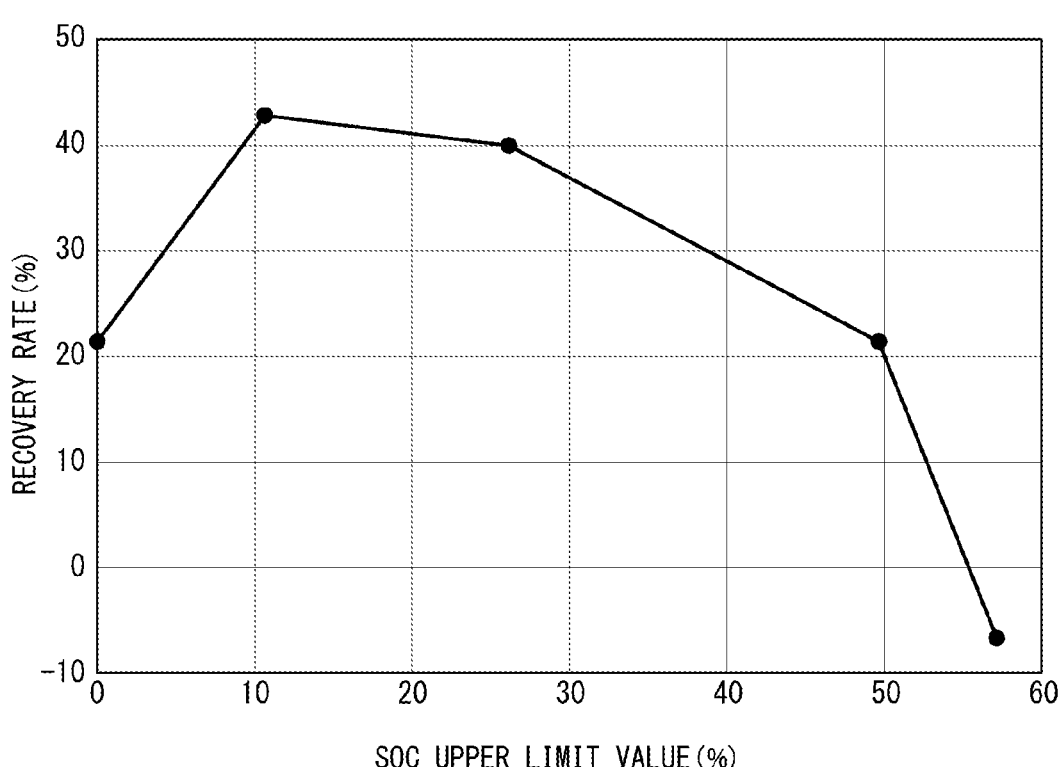
FIG. 10 is a graph showing a test result.

As shown in Table 5 and FIG. 10, a tendency of the recovery rate did not change much when the current changed in comparison with Example 2 (see FIG. 7).

Example 6

A sample with a decrease in performance was obtained in the same manner as Example 2 except that a temperature condition when the sample with the decrease in performance was fabricated was changed from 25° C. to 50° C.

The recovery processing test was performed on the sample in the same manner as Example 2. The results are shown in Table 6 and FIG. 11.

TABLE 6

| Charge capacity (Ah) | 0 | 0.3 | 0.75 | 1.4 | 1.6 |
|---|---|---|---|---|---|
| SOC upper limit value (%) | 0 | 10.6 | 26.4 | 48.8 | 55.7 |
| SOC lower limit value (%) | 0 | 0 | 0 | 0 | 0 |
| Initial capacity (Ah) | 3.04 | 2.96 | 2.96 | 2.99 | 3.00 |
| Capacity after degradation (Ah) | 2.91 | 2.83 | 2.84 | 2.87 | 2.87 |
| Capacity after recovery (Ah) | 2.95 | 2.92 | 2.92 | 2.90 | 2.85 |
| Recovery rate (%) | 31 | 69 | 67 | 25 | −15 |

Figure 11:
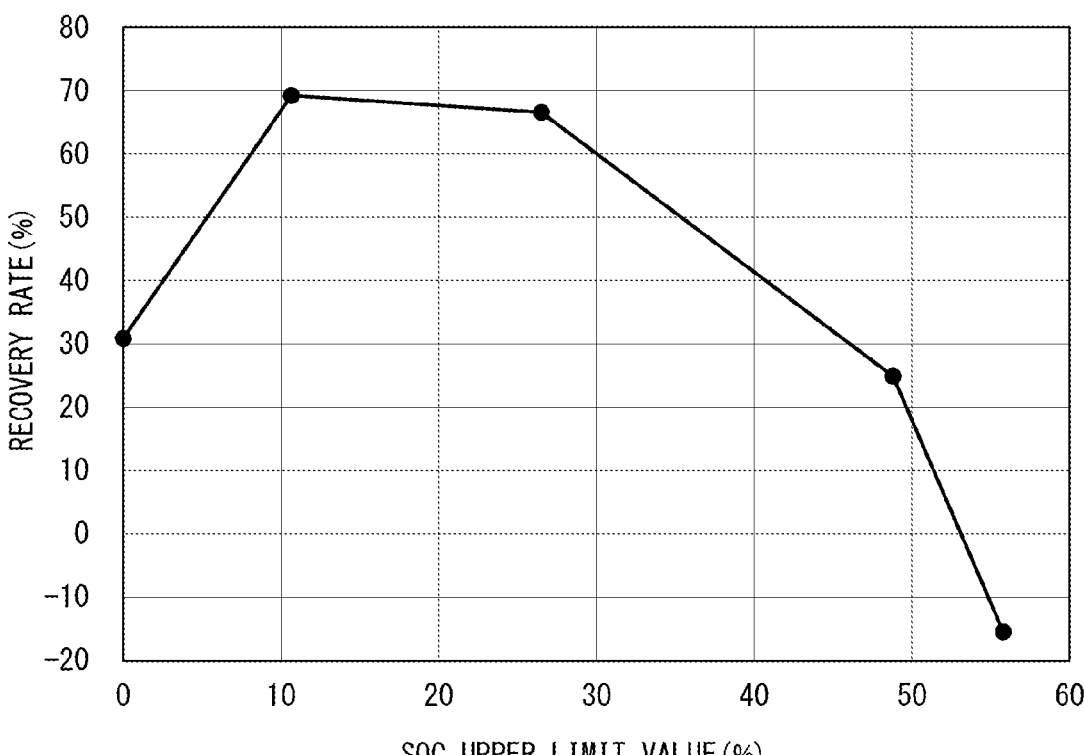
FIG. 11 is a graph showing a test result.

As shown in Table 6 and FIG. 11, a tendency of the recovery rate was not much different from the case in which the temperature condition was 25° C. (see FIG. 7).

Comparative Example 1

A sample with a decrease in performance was obtained in the same manner as Example 1 except that the temperature condition when the sample with the decrease in performance was fabricated was changed from 25° C. to −10° C.

The recovery processing test was performed on the sample in the same manner as Example 1. The results are shown in Table 7 and FIG. 12.

TABLE 7

| Performance decrease condition | Comparative example 1 Low temperature | Example 1 Normal temperature |
|---|---|---|
| Initial capacity (Ah) | 3.00 | 3.01 |
| Capacity after degradation (Ah) | 2.24 | 2.86 |
| Capacity after recovery (Ah) | 2.36 | 2.93 |
| Recovery rate (%) | 15.8 | 44.5 |

Figure 12:
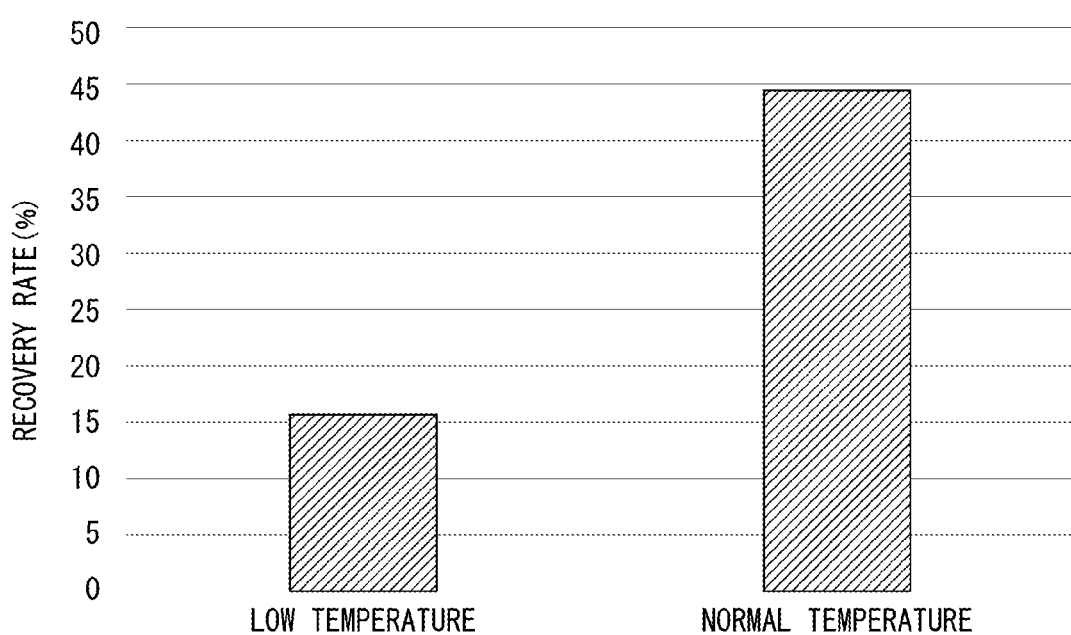
FIG. 12 is a graph showing a test result.

As shown in Table 7 and FIG. 12, the sample with the decrease in performance at a low temperature has a recovery rate lower than that of the sample with the decrease in performance at a normal temperature.

From this, it can be seen that the recovery processing method of the embodiment is effective for the lithium ion battery with the decrease in performance at a normal temperature.

Comparative Example 2

The sample with the decrease in performance (a temperature when the performance is lowered is 25° C.) was obtained in the same manner as Example 1 (the sample with the decrease in performance in which a decrease in performance condition is set as a normal temperature).

The sample with the decrease in performance was obtained in the same manner as Example 1 except that the temperature condition was −10° C. when the sample with the decrease in performance was fabricated (the sample with the decrease in performance in which the decrease in performance condition is set as a low temperature).

A cycle including the following two processes was repeatedly performed on these samples a plurality of times. The processing time was 72 hours.

A first process: The SOC of the lithium ion battery is assumed to be 1.1% by charging. The charge time was ten seconds.

A second process: The SOC of the lithium ion battery is assumed to be 0% by discharging. The discharge time was ten seconds.

TABLE 8

| Performance decrease condition | Low temperature | Normal temperature |
|---|---|---|
| Initial capacity (Ah) | 3.06 | 3.00 |
| Capacity after degradation (Ah) | 2.17 | 2.85 |
| Capacity after recovery (Ah) | 2.51 | 2.89 |
| Recovery rate (%) | 38.0 | 26.7 |

As shown in Table 8, in Comparative example 2 having the SOC (the upper limit value S1) in the first process smaller than that in Comparative example 1, the recovery rate was higher in the case of the decrease in performance at the low temperature than in the case of the decrease in performance at the normal temperature.

From this, it can be seen that effectiveness of the recovery processing changes depending on the conditions at the time of the decrease in performance.

Example 7

A recovery processing test was performed in the same manner as Example 1 except for the current and the processing time upon charge/discharge. The results are shown in Table 9.

TABLE 9

| | | | |
|---|---|---|---|
| Processing current (A) | 9 | 3 | 0.6 |
| Processing time (hr) | 20 | 20 | 20 |
| Number of cycles | 300 | 100 | 20 |
| Initial capacity (Ah) | 2.98 | 2.96 | 3.03 |
| Capacity after degradation (Ah) | 2.82 | 2.82 | 2.83 |
| Capacity after recovery (Ah) | 2.88 | 2.88 | 2.91 |
| Recovery rate (%) | 38 | 42.86 | 40 |

As shown in Table 9, the number of cycles and the current did not significantly affect the recovery rate.

The range of the SOC (see FIG. 6) that is equal to or greater than the value of the SOC at the point M2 in which the gradient of the SOC-voltage curve is two times the minimum value and that is equal to or smaller than the value of the SOC at the point M1 in which the gradient of the SOC-voltage curve is the minimum value is referred to as "a specified range."

The sample with the decrease in performance at the normal temperature (for example, 25° C.) is referred to as "the sample with the decrease in performance at the normal temperature." The sample with the decrease in performance at the low temperature (for example, −10° C.) is referred to as "the sample with the decrease in performance at the low temperature."

In the recovery processing in which the upper limit value S1 of the SOC is a value within a specific range, a higher recovery rate was obtained in the sample with the decrease in performance at the normal temperature (Examples 1 and 2) than in the sample with the decrease in performance at the low temperature (Comparative example 1).

On the other hand, the recovery processing in which the upper limit value S1 is below the lower limit value of the specific range was not very effective for the sample with the decrease in performance at the normal temperature (see Comparative example 2).

The recovery processing method of the embodiment is useful when the following condition (1) is satisfied, and when both the condition (1) and the condition (2) are satisfied.

(1) When the (above-mentioned) recovery processing in which the upper limit value S1 of the SOC is set to the value within the specific range was performed with respect to the sample with the decrease in performance at the normal temperature and the sample with the decrease in performance at the low temperature, the recovery rate in the case of the decrease in performance at the normal temperature is higher than the recovery rate in the case of the decrease in performance at the low temperature (see Table 7).

(2) When the (above-mentioned) recovery processing in which the upper limit value S1 of the SOC is below the lower limit value of the specific range was performed with respect to the sample with the decrease in performance at the normal temperature and the sample with the decrease in performance at the low temperature, the recovery rate in the case of the decrease in performance at the normal temperature is lower than the recovery rate in the case of the decrease in performance at the low temperature (see Table 8).

When the condition (1) is satisfied and when both the condition (1) and the condition (2) are satisfied, as a reason for the decrease in performance, it can be assumed that the residue of the lithium ions in the negative electrode deep part (the lithium ion residue in the negative electrode) is large.

The recovery processing method of the embodiment may be implemented when the condition (1) is satisfied. The recovery processing method of the embodiment may be implemented when both the condition (1) and the condition (2) are satisfied.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A recovery processing method of a lithium ion battery having a positive electrode and a negative electrode and in which performance has decreased due to a residue of lithium ions in the negative electrode, the method comprising:
    repeating a cycle a plurality of times,
    the cycle including:
    a first process of setting an SOC of the lithium ion battery to a first value, that is equal to or smaller than a value of the SOC in which a gradient of an SOC-voltage curve is a minimum value and that is equal to or greater than the value of the SOC in which the gradient of the SOC-voltage curve is two times the minimum value, by charging; and
    a second process of setting the SOC of the lithium ion battery to a second value, that is smaller than the first value, by discharging.

2. The recovery processing method of the lithium ion battery according to claim 1, wherein the first value is 30% or less.

3. The recovery processing method of the lithium ion battery according to claim 1, wherein the second value is less than 10%.

4. The recovery processing method of the lithium ion battery according to claim 1, wherein, prior to the first process and the second process, whether or not there is a decrease in performance of the lithium ion battery is determined, and the first process and the second process are performed only when a decrease in performance is confirmed.

5. A charge/discharge device electrically connected to a lithium ion battery having a positive electrode and a negative electrode and in which performance is decreased by a residue of lithium ions in the negative electrode,
    the charge/discharge device comprising a controller configured to perform charge/discharge of the lithium ion battery,
    wherein the controller repeats a cycle a plurality of times, the cycle including:
    a first process of setting an SOC of the lithium ion battery to a first value, that is equal to or smaller than a value of the SOC in which a gradient of the SOC-voltage curve is a minimum value and that is equal to or greater than the value of the SOC in which the gradient of the SOC-voltage curve is two times the minimum value, by charging; and
    a second process of setting the SOC of the lithium ion battery to a second value, that is smaller than the first value, by discharging.

6. A non-transitory computer readable storage medium storing a program configured to cause a charge/discharge device, which is electrically connected to a lithium ion battery having a positive electrode and a negative electrode and in which performance is decreased by a residue of lithium ions in the negative electrode, to repeat a cycle a plurality of times,
    the cycle including:
    a first process of setting an SOC of the lithium ion battery to a first value, that is equal to or smaller than a value of the SOC in which a gradient of the SOC-voltage curve is a minimum value and that is equal to or greater than the value of the SOC in which the gradient of the SOC-voltage curve is two times the minimum value, by charging; and
    a second process of setting the SOC of the lithium ion battery to a second value, that is smaller than the first value, by discharging.

* * * * *